(12) United States Patent
Baluja

(10) Patent No.: US 11,605,947 B2
(45) Date of Patent: Mar. 14, 2023

(54) INTRINSICALLY SAFE CIRCUIT WITH LOW LEAKAGE CURRENT

(71) Applicant: ABB Schweiz AG, Baden (CH)

(72) Inventor: Wilfredo Fernando Baluja, Baton Rouge, LA (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/393,478

(22) Filed: Aug. 4, 2021

(65) Prior Publication Data

US 2023/0041997 A1 Feb. 9, 2023

(51) Int. Cl.
*H02H 9/04* (2006.01)
*H02H 1/00* (2006.01)

(52) U.S. Cl.
CPC ............ *H02H 9/04* (2013.01); *H02H 1/0007* (2013.01)

(58) Field of Classification Search
CPC .......... H02H 9/008; H02H 9/025; H02H 9/04; H02H 9/042; H02H 9/045; H02H 9/041; H02H 9/043; H02H 1/0007
See application file for complete search history.

(56) References Cited

U.S. PATENT DOCUMENTS

| 4,638,396 | A * | 1/1987 | Mukli | H02H 9/008 361/101 |
| 2002/0015273 | A1* | 2/2002 | Lytollis | H02H 9/008 361/58 |
| 2009/0253388 | A1* | 10/2009 | Kielb | G01D 21/00 455/117 |
| 2019/0386486 | A1* | 12/2019 | Koch | G05F 1/573 |

FOREIGN PATENT DOCUMENTS

CN 102084307 A * 6/2011 ............. G01D 21/00

OTHER PUBLICATIONS

Stahl, Intrinspak Single-Channel Safety Barriers, Series 9001, Jun. 5, 2014, 18 pages.
Eaton Corp., Technical Data MTL Intrinsic Safety Solutions, MTL700 Range, Nov. 2016, 13 pages.
Stahl, Automation Catalog 8000, Intrinsically Safe Products, Jul. 9, 2008, 251 pages.
PEPPER+FUCHS, Manual Z-System Zener Barriers, 2016, 32 pages.
Allen-Bradley, Zener Barriers, Technical Data Bulletin 937Z, Jul. 2016, 10 pages.

* cited by examiner

*Primary Examiner* — Jared Fureman
*Assistant Examiner* — Nicolas Bellido
(74) *Attorney, Agent, or Firm* — Armstrong Teasdale LLP

(57) ABSTRACT

According to an aspect of this disclosure, an intrinsically safe circuit includes a voltage source, a Zener diode, a transistor, a switching element, one or more resistors, and a current limiting stage. According to this aspect, the intrinsically safe circuit may be configured such that an overvoltage threshold is determined by a voltage across the Zener diode, a base-emitter voltage of the transistor, and a voltage across the one or more resistors.

20 Claims, 4 Drawing Sheets

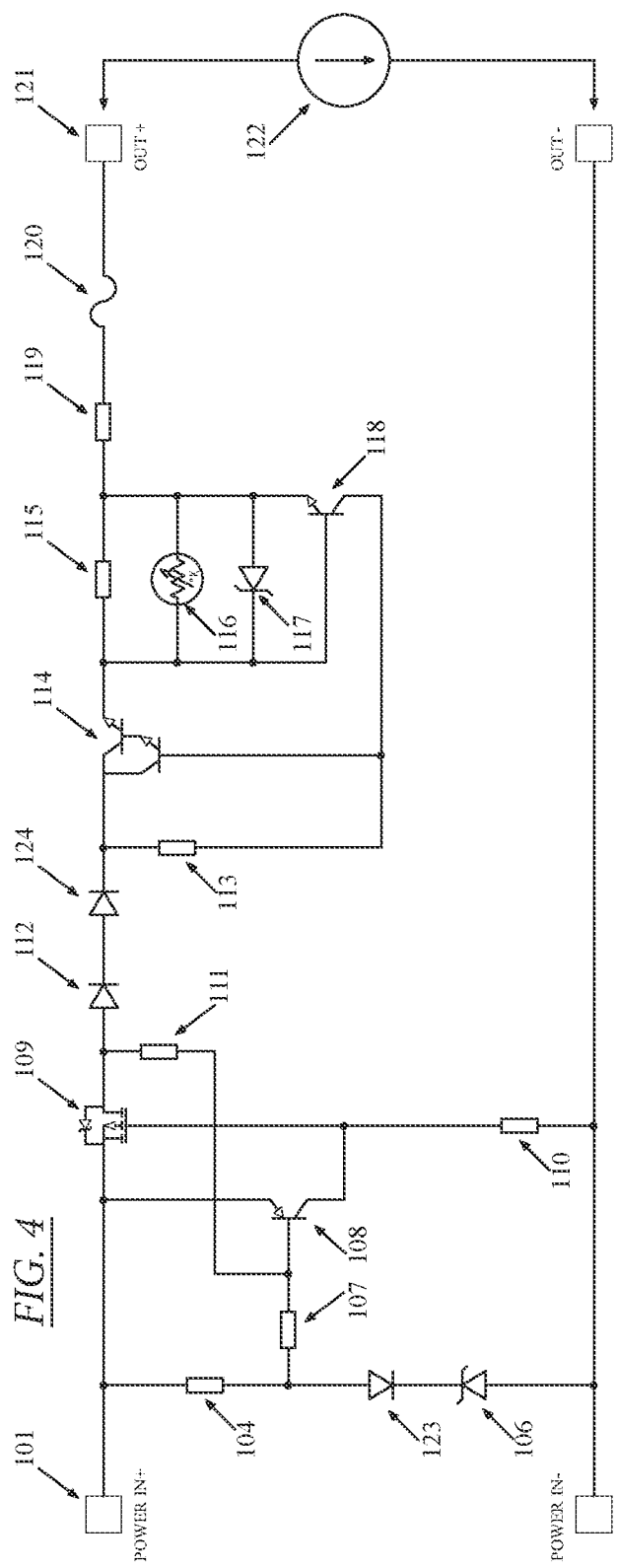

INTRINSICALLY SAFE CIRCUIT WITH LOW LEAKAGE CURRENT

TECHNICAL FIELD

The present subject matter relates to intrinsically safe electronics, and more particularly, to intrinsically safe barriers.

BACKGROUND

Often times, intrinsically safe barriers are used with loop-powered field transmitters, e.g., in the 4 mA to 20 mA range, to limit the energy provided to such field transmitters when installed in explosive atmospheres. Explosive atmospheres can be caused by flammable gases, mists, vapors, combustible dusts, or a combination thereof. If a combustible substance mixes with air in sufficient quantities, then any source of ignition introduced into an environment with an explosive atmosphere may result in an explosion. Intrinsically safe barriers connect intrinsically safe equipment suitable for use within the explosive atmosphere (e.g., intrinsically safe field transmitters, solenoids, proximity sensors, and encapsulated circuitry), to control systems for operating, managing, and communicating with the intrinsically safe equipment.

Typically, the control systems, which may be accessible to humans such as for manipulation of the control software and overall control of the system, are not located entirely within the explosive atmosphere. Physically and electrically, intrinsically safe barriers are disposed between control systems and the intrinsically safe equipment within the explosive environment. Typically, intrinsically safe Zener barriers prevent the transfer of unacceptably high energy to the explosive atmosphere from elements outside of the explosive atmosphere.

Conventional barriers, such as that shown in FIG. 1, face two typical challenges. First, the leakage current flowing through clamping Zener diodes may introduce error to a loop current measured by a control system associated with the intrinsically safe barrier. As a result, accuracy of a control loop is decreased. Decreased accuracy of the control loop is generally unacceptable for applications employing an intrinsically safe barrier. Second, in conventional barriers the risk of damaging a fuse in the barrier is considerable, e.g., due to overvoltage from the power supply, high in-rush currents during power up, hot-plugging, and/or unintentional short circuits during installation or maintenance.

The description provided in the background section should not be assumed to be prior art merely because it is mentioned in or associated with the background section. The background section may include information that describes one or more aspects of the subject technology.

SUMMARY

According to one aspect, an intrinsically safe circuit may comprise a Zener diode, a first transistor, a switching element, one or more resistors, and a current limiting stage. An over-voltage threshold of the intrinsically safe circuit may be determined by a voltage across the Zener diode, a base-emitter voltage of the transistor, and a voltage across the one or more resistors.

In some embodiments, the over-voltage threshold may be a sum of the voltage across the Zener diode, the base-emitter voltage of the first transistor, and the voltage across the one or more resistors. The leakage current across the one or more resistors may be negligible when an input voltage is below the over-voltage threshold.

In some embodiments, the intrinsically safe circuit may comprise a voltage clamping stage that includes the Zener diode, the first transistor, the switching element, and the one or more resistors. The switching element may be a MOSFET. The voltage clamping stage may further comprise a pull-down resistor coupled between a gate of the MOSFET and the ground line. A collector of the first transistor may be coupled between the gate of the MOSFET and the pull-down resistor.

In some embodiments, the voltage clamping stage may further include at least one additional diode. The at least one additional diode, the one or more resistors, and the Zener diode may be disposed in series between a positive voltage line and a ground line. The intrinsically safe circuit may further comprise an additional resistor coupled between a base of the first transistor and an intermediate node in the series of the at least one additional diode, the one or more resistors, and the Zener diode.

In some embodiments, the current limiting stage may comprise second, third, and fourth transistors, a fast-acting transient suppressor, and a negative temperature coefficient thermistor. The fast-acting transient suppressor and the negative temperature coefficient thermistor may be disposed in parallel. The fast-acting transient suppressor and the negative temperature coefficient thermistor can operate to protect the fourth transistor from over-voltage.

According to another aspect, a system may comprise a voltage source, a load, and an intrinsically safe circuit comprising a voltage clamping circuit and a current limiting circuit. The intrinsically safe circuit may be configured to accept an input voltage from the voltage source and to maintain a leakage current of less than 10 μA while the input voltage is less than a maximum safe voltage.

In some embodiments, the load may be an intrinsically safe component within an intrinsically safe environment. The intrinsically safe component may be a loop-powered field transmitter. The intrinsically safe component may be a level magnetostrictive transmitter. The intrinsically safe circuit may be configured to protect the intrinsically safe component from over-voltage events when the input voltage is up to 90 volts.

According to yet another aspect, a method of operating an intrinsically safe field transmitter may comprise coupling a voltage supply to an intrinsically safe circuit, coupling an intrinsically safe field transmitter to the intrinsically safe circuit, and powering the intrinsically safe field transmitter by the voltage supply via the intrinsically safe circuit. The intrinsically safe circuit can provide a voltage drop less than 2 volts between an input voltage received from the voltage supply and an output voltage delivered to the intrinsically safe field transmitter.

In some embodiments, a leakage current of the intrinsically safe circuit can be less than 10 μA. The intrinsically safe circuit can protects the intrinsically safe field transmitter from over-voltage events when the input voltage is less than 90 volts.

Other aspects and advantages of the present invention will become apparent upon consideration of the following detailed description and the attached drawings wherein like numerals designate like structures throughout the specification.

BRIEF DESCRIPTION OF THE DRAWINGS

The detailed description below refers to the appended drawings, in which:

FIG. 4 is a schematic circuit diagram illustrating another alternative embodiment of the intrinsically safe circuit with low leakage current and current limiting features.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject matter disclosed.

DETAILED DESCRIPTION OF THE DRAWINGS

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Still further, modules and processes depicted may be combined, in whole or in part, and/or divided, into one or more different parts, as applicable to fit particular implementations without departing from the scope of the present disclosure. Accordingly, the drawings and description are to be regarded as illustrative in nature and not restrictive.

Figure 1:
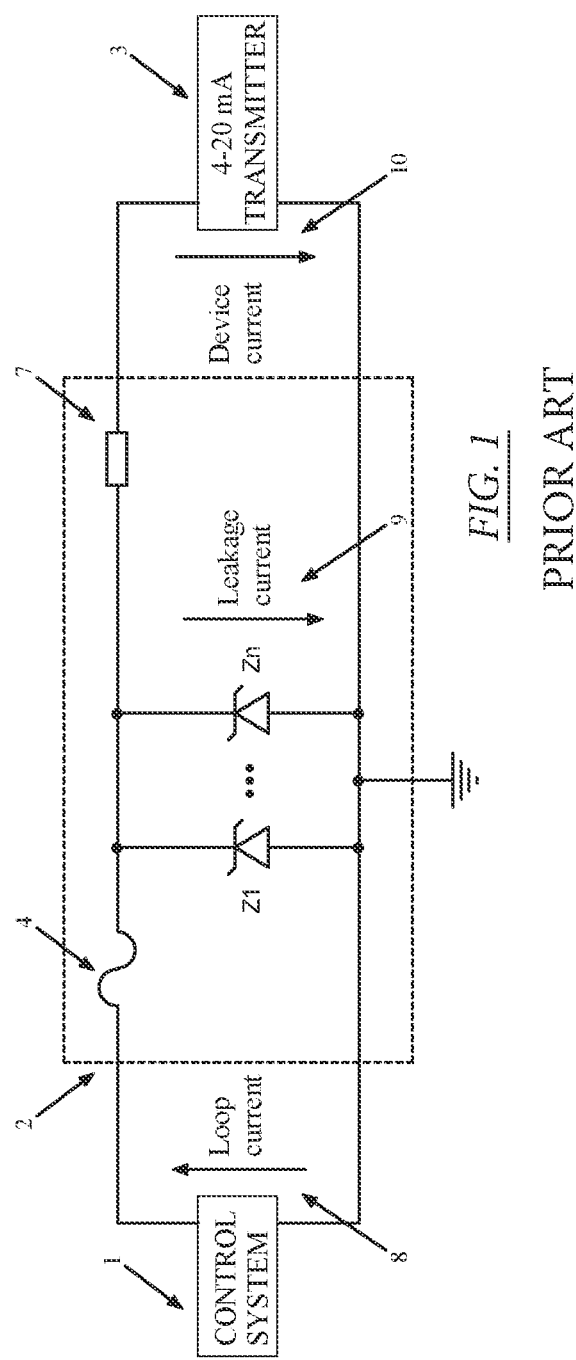
FIG. 1 is a schematic circuit diagram illustrating a conventional intrinsically safe barrier for use with loop-powered field transmitters.
Figure 2:
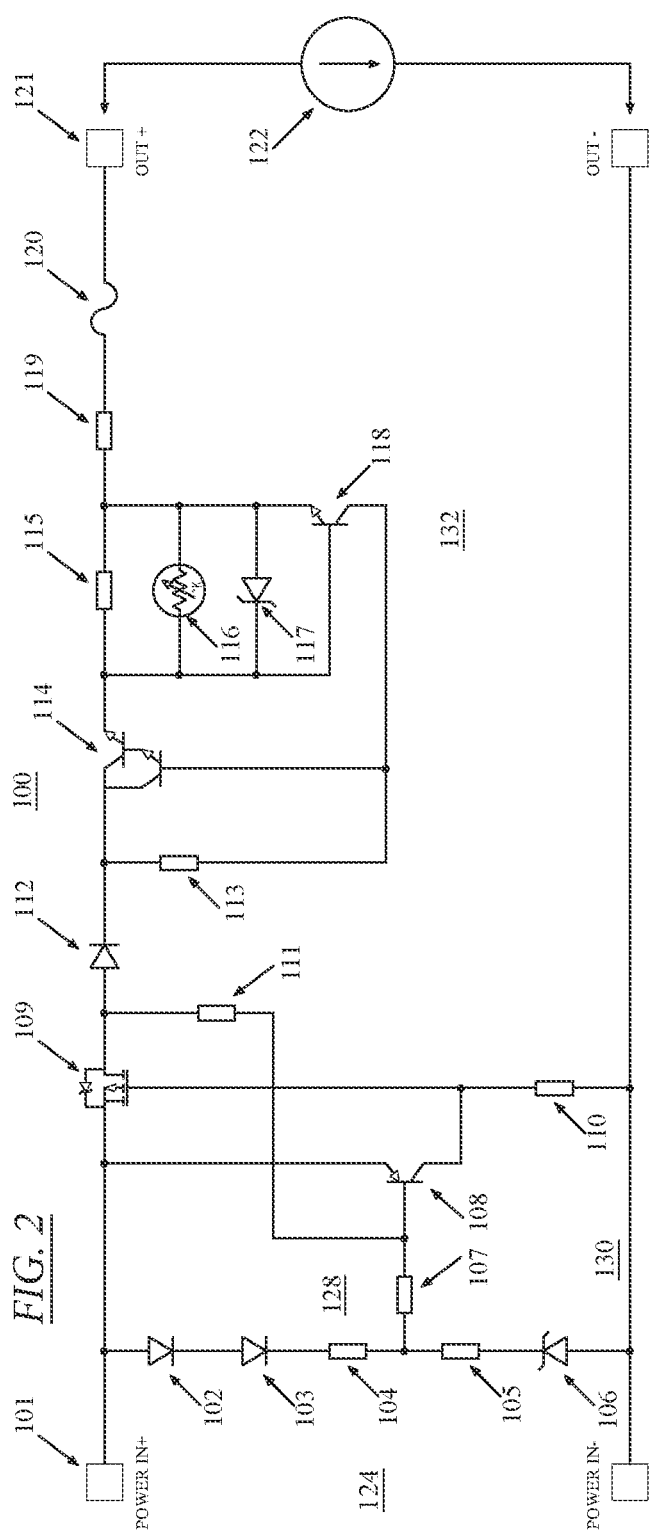
FIG. 2 is a schematic circuit diagram illustrating an intrinsically safe circuit with low leakage current and current limiting features for intrinsically safe components, such as loop-powered field transmitters.

Referring now to FIG. 2, an intrinsically safe circuit 100 for facilitating connections (electrical, communications, etc.) between a control system and at least one intrinsically safe module/output load disposed within a hazardous environment (e.g., an explosive atmosphere or another environment for which intrinsically safe modules are desired). The intrinsically safe circuit with low leakage current and current limiting features for 4 mA to 20 mA field transmitters (hereafter 4-20 mA field transmitters) is configured to improve the reliability and flexibility of intrinsically safe circuits. Conventional barriers, such as that shown in FIG. 1 and discussed above, often face two typical challenges: error introduction as a result of leakage current and fuse sensitivity.

The intrinsically safe circuit 100 of the present disclosure provides energy limitation that is desirable for interfacing with intrinsically safe circuitry and further ensures reliable operation of a 4-20 mA current loop (i.e., such as would be suitable for delivery of process control signals). Additionally, a 4-20 mA current loop powered via the intrinsically safe circuit 100 maintains accuracy of the 4-20 mA current loop and prevents potential damage to barrier components from over-threshold inrush currents, unintended short circuits, over-voltage operation, and/or a combination thereof.

Referring again to the schematic circuit diagram of FIG. 1, the most common configuration of conventional barriers for use in intrinsically safe equipment installations is shown. The control system 1 powers a control loop. A conventional intrinsically safe barrier 2 is inserted between the control system 1 and the 4-20 mA loop-powered field transmitter 3 to limit an amount of energy supplied to the field transmitter 3.

Within the conventional barrier 2, a fuse 4 is used to protect a number of redundant Zener diodes $Z_1 \ldots Z_n$. The fuse 4 typically operates in accordance with IEC (International Electrotechnical Commission) standard 60079-11. The Zener diodes $Z_1 \ldots Z_n$ operate to clamp the voltage to a desired value, while a resistor 7 limits the current to the device (e.g., a device current 10 in the circuit of FIG. 1).

Conventional intrinsically safe barriers incur a leakage current 9 via a parallel path formed by the clamping devices (i.e., the Zener diodes $Z_1 \ldots Z_n$). This phenomenon results in inaccuracy of the 4-20 mA current read by analog input cards of control modules/equipment of the control system 1. A loop current 8 is measured at the control system 1. The loop current 8 is equal to a sum of the device current 10 through the 4-20 mA device (shown in FIG. 1 as a field transmitter) and the leakage current 9 flowing through the Zener diodes $Z_1 \ldots Z_n$. The loop current 8 is observed at the control system 1. The leakage current 9 increases quickly when a supply voltage approaches a safe output voltage $U_o$ of the conventional barrier 2.

For example, the safe output voltage $U_o$ for conventional barriers, like the conventional barrier 2 of FIG. 1, is typically 28 V, while the maximum working voltage of examples such as the conventional barrier 2 is defined as 24.9 V for a specified leakage current of 10 μA. Similarly, an absolute maximum voltage threshold before the fuse 4 is damaged is defined as 25.9 V. Even when the 3 V gap between maximum working voltage and absolute maximum voltage is observed, if the leakage current 9 is 10 μA then about 0.06% error should be expected (see Equation 1):

$$100 \times 0.01 \div 16 \text{ mA} = 0.06\% \text{ error} \quad \text{[Equation 1]}$$

Thus, the amount of error (i.e., 0.06%) introduced during normal operation at the maximum working voltage is more error than may be tolerated while maintaining accuracy for many 4-20 mA loop-powered field transmitters. For example, this amount of error is significantly more than the 0.01% accuracy desired for level magnetostrictive transmitters that may be used with an intrinsically safe barrier or circuit.

Additionally, a typical example of the conventional barrier 2 may have an end-to-end resistance of about 300 to 340 ohms. The end-to-end resistance results in a voltage drop of up to 7.2 V (see Equation 2):

$$340 \text{ ohms} \times 21 \text{ mA} = 7.2 \text{ V} \quad \text{(Equation 2)}$$

If any additional voltage drop occurs across series diodes configured for reverse polarity protection, then the voltage drop resulting from the conventional barrier 2 exceeds 8 V. A voltage drop of 8 V significantly affects the minimum supply voltage that may be used connected by the conventional barrier 2 to the intrinsically safe electrical environment. Likewise, supply voltage specified by the 4-20 mA loop-powered field transmitter 3 is, in turn, limited by the voltage drop across the conventional barrier 2 supplying power to the 4-20 mA loop-powered field transmitter 3. The 4-20 mA loop-powered field transmitter 3 typically requires a 12.0 V supply voltage for operation. However, given the voltage drop described hereinabove (i.e., 8 V), the power supply selection for the 4-20 mA loop-powered field transmitter 3 is consequently narrowed to 20-24.9 V. At a supply voltage of 24.9 V, the leakage current 9 corresponding to such a supply voltage may introduce an amount of error into the loop current 8 that the supply voltage may be reduced still further (i.e., below 24.9 V). At this level and lower supply voltages, the 4-20 mA loop-powered field transmitter 3 may not be operational.

Referring again to FIG. 2, the intrinsically safe circuit 100 is configured to facilitate connection between an input/power supply 124 (i.e., the control system) and at least one output load 122 (i.e. an intrinsically safe module) while minimizing a voltage drop between a positive input terminal 101 and a positive output terminal 121. In exemplary embodiments, the maximum voltage drop between the input 124 and the output 121 of the intrinsically safe circuit 100 is about 2 V. This maximum voltage drop represents a significant improvement as compared with the greater than 8 V voltage drop experienced in the conventional barriers, such as the conventional barrier 2 shown in FIG. 1. A load 122, such as a loop-powered field transmitter, an intrinsically safe electrical component, and/or another suitable intrinsically safe load, may be electrically coupled to the output 121.

Further, the intrinsically safe circuit 100 is configured to accept input voltages $U_i$ up to the maximum safe output voltage $U_o$ (i.e., $U_i \leq U_o$) while maintaining very low leakage current. An exemplary embodiment of the intrinsically safe circuit 100 facilitates $U_i \leq U_o$ with leakage current in the tens of nano-amps (nA), such as between 5 and 20 nano-amps. In some embodiments, the leakage current may be about 10 nA.

The intrinsically safe circuit 100 safely accepts input voltages that exceed the maximum safe output voltage by around 1 V (i.e., $U_i \leq (U_o + 1 \text{ V})$) while maintaining leakage current of less than 10 μA. Again, this represents an improvement as compared to the ratio of input voltage to maximum safe output voltage capable from the conventional barrier 2, i.e., $U_i \leq (U_o - 3 \text{ V})$. Further still, the intrinsically safe circuit 100 provides overvoltage protection that interrupts the output 121 when the input voltage $U_i$ exceeds a value whereat the intrinsically safe circuit 100 cannot guarantee the safe permissible output voltage (i.e., $U_i > U_o + 1$ V). The intrinsically safe circuit 100 tolerates overvoltage up to 90 V or more without risking damage to components. In examples, a threshold for overvoltage protection may be determined by selection of the switching element 109 and the electrical properties thereof. Additionally, the intrinsically safe circuit 100 is configured to provide reverse polarity protection.

FIG. 2 is a schematic circuit diagram detailing an example configuration of the intrinsically safe circuit 100 having a voltage clamping stage 130 and a current limiting stage 132. When the input voltage $U_i$ is applied through the positive input terminal 101, it reaches the source of a switching element 109. In the exemplary embodiment of FIG. 2, the switching element 109 is a p-channel MOSFET (metal-oxide-semiconductor field-effect transistor) that operates as a switching element. Simultaneously, a gate of the MOSFET switching element 109 is pulled down to ground through pull-down resistor 110. Thereby, the p-channel MOSFET 109 is actuated to an "on" state. A PNP transistor 108 operates to control the state of the switching element 109.

The input voltage $U_i$ is present across a bias circuit 128 of the transistor 108. In the illustrative embodiment of FIG. 2, the bias circuit comprises diodes 102, 103, resistors 104, 105, 107, and Zener diode 106. In alternative embodiments (see, e.g., FIGS. 3-4), the diodes 102, 103 and resistor 104 may be omitted or replaced. In the exemplary embodiment of FIG. 2, the diode 102, the diode 103, the resistor 104, the resistor 105, and the Zener diode 106 are disposed in series between a positive input line and a ground line. The resistor 107 is connected from a node (between the resistors 104, 105) to a base of the transistor 108. A collector of the transistor 108 is connected to a node between the switching element 109 and the pull-down resistor 110. A resistor 111 is connected from a node (between the resistor 107 and a base of the transistor 108) and the positive input line. An over-voltage threshold $V_{th}$, which is an input voltage amount required to change the state of the intrinsically safe circuit 100 to "off", is equal to the sum of a voltage across the Zener diode 106 (i.e., the Zener voltage $V_z$) plus a base-emitter voltage $V_{be}$ across the transistor 108 and a voltage drop $V_{(5-7)}$ across the resistors 105, 107 (see Equation 3):

$$V_{th} = V_z + V_{be} + V_{(5-7)} \quad \text{(Equation 3)}$$

However, because a leakage current through the resistors 105, 107 is very small (i.e., below 1 nA), the voltage drop $V_{(5-7)}$ across the resistors 105, 107 is also below 1 mV and may be omitted in evaluating properties of the intrinsically safe circuit 100. As a result, the over-voltage threshold $V_{th}$ may be approximated as equal to the Zener diode voltage $V_z$ summed with the base-emitter voltage $V_{be}$ (see Equation 4):

$$V_{th} = V_z + V_{be} \quad \text{(Equation 4)}$$

Under normal operational conditions, the input voltage $U_i$ at the positive input terminal 101 is less than the over-voltage threshold $V_{th}$ (i.e., $U_i < U_{th}$). Additionally, under normal operational conditions, the base-emitter voltage $V_{be}$ of the transistor 108 is insufficient for the transistor 108 to actuate itself to the "on" state. As a result, the gate of the MOSFET switching element 109 remains pulled down to ground maintaining the MOSFET switching element 109 in the "on" state. However, when the input voltage $U_i$ at the positive input terminal 101 is equal or above the over-voltage threshold $V_{th}$, the base-emitter voltage $V_{be}$ of the transistor 108 is sufficient for the transistor 108 to actuate itself to the "on" state. Under these circumstances, the gate of the MOSFET switching element 109 is pulled up to the input voltage $U_i$, thereby actuating the MOSFET switching element 109 to an "off" state.

The intrinsically safe circuit 100 is configured such that the safe output voltage $U_o$ approximately equals the Zener voltage (i.e., $U_o \approx V_z$). In the exemplary configuration of FIG. 2, a maximum voltage at a drain of the MOSFET switching element 109 is the over-voltage threshold $V_{th}$ (i.e., $V_{th} = V_z + V_{be}$). Excess voltage is compensated for by a diode 112 disposed downstream of the MOSFET switching element 109 (see Equation 5 below). The diode 112 may be selected to have a forward voltage equal or larger than the base-emitter voltage $V_{be}$ of the transistor 108 such that $V_{be} = V_D$. Thus, the resulting voltage at the output of the voltage clamping stage 130 is $U_o = V_z$.

$$U_o = V_{th} - V_D = V_z + V_{be} - V_D \quad \text{(Equation 5)}$$

A leakage current to ground through the voltage clamping stage 130 is about 40 nA when the input voltage $U_i$ equals the Zener voltage $V_z$ of the Zener diode 106 (i.e., $U_i = V_z$). Again, this represents an improvement as compared to the conventional barrier 2 of FIG. 1, because the intrinsically safe circuit 100 safely accepts input voltages that exceed the maximum safe output voltage by around 1 V (i.e., $U_i \leq (U_o + 1 \text{ V})$) while maintaining leakage current of less than 10 μA.

The intrinsically safe circuit 100 tolerates relatively higher input voltage $U_i$, in excess of the expected safe output voltage $U_o$. As mentioned hereinabove, the input voltage $U_i$ at the positive input terminal 101 is less than the over-voltage threshold $V_{th}$, (i.e. $U_i < U_{th}$). Therefore, the base-emitter voltage $V_{be}$ of the transistor 108 is sufficient for the transistor 108 to actuate itself to the "on" state. Under these circumstances, the gate of the MOSFET switching element 109 remains pulled down to ground thereby maintaining the MOSFET switching element 109 in an "off" state.

Referring still to FIG. 2, the current limiting stage 132 is configured such that a transistor 114 (or transistor group and/or pair) operates as a current switch, and a transistor 118 operates as a current control mechanism. Initially, the transistor 114 is actuated to the "on" state due to a fixed current through a resistor 113 biasing a base of the transistor 114. Before current flows, a voltage across a sensing resistor 115 is relatively small, and consequently a base-emitter voltage $V_{be}$ is not sufficient to actuate the transistor 118 to an "on" state. As the current increases, due to inrush current from power up or an excessive load during normal operation, a voltage across the sensing resistor 115 increases until the base-emitter voltage $V_{be}$ of the transistor 118 is sufficient to actuate the transistor 118 to an "on" state. When the transistor 118 enters the "on" state, the base-emitter voltage $V_{be}$ of the transistor 114 is pulled down an amount sufficient to partially actuate the transistor to an "off" state. The ohm-value of the sensing resistor 115 determines a current limit for the current limiting stage 132, i.e., $R_{15}=V_{be} \div I_{limit}$. Accordingly, the transistors 114, 118 and the resistors 113, 115 manage the limit current $I_{limit}$ that is allowed to flow through the intrinsically safe circuit 100.

Given that the base-emitter voltage quality of transistors typically changes with variation in temperature, an NTC (negative temperature coefficient) thermistor 116 is utilized to maintain a stable limit current $I_{limit}$. The NTC thermistor 116 is disposed in parallel with the sensing resistor 115 in order to compensate for the change of the base-emitter voltage $V_{be}$ with temperature increase or decrease. The parallel NTC thermistor 116 reduces a tolerance for the current limiting stage 132 thereby improving accuracy of a control current. When temperature decreases the $V_{be}$ saturation also increases. Due to the increased $V_{be}$ saturation, higher current is required to partially actuate the transistor 118 to an "on" state, unless the resulting parallel resistance also increases at lower temperature. In other words, the magnitude of $V_{be}$ saturation and parallel resistance (both resulting from operation/behavior of the NTC thermistor 116) increase or decrease in correspondence with one another (i.e., the magnitude of $V_{be}$ saturation and parallel resistance both increase when temperature decreases and both decrease when temperature increases.

In exemplary embodiments, one or more dedicated sub-circuits may be included in the current limiting stage 132 to improve the accuracy of limit current $I_{limit}$ linearization. A fast-acting transient suppressor 117 is disposed in parallel with the transistor 118 (and the NTC thermistor 116) to protect the base-emitter junction of the transistor 118 from overvoltage events.

A fuse 120 ensures that, in a case of failure of the current limiting stage/circuit 132, the safe output current $I_o$ is not exceeded. Further, a low value resistor 119 may be included in exemplary embodiments to meet standards set in IEC 60079-11.

Figure 3:
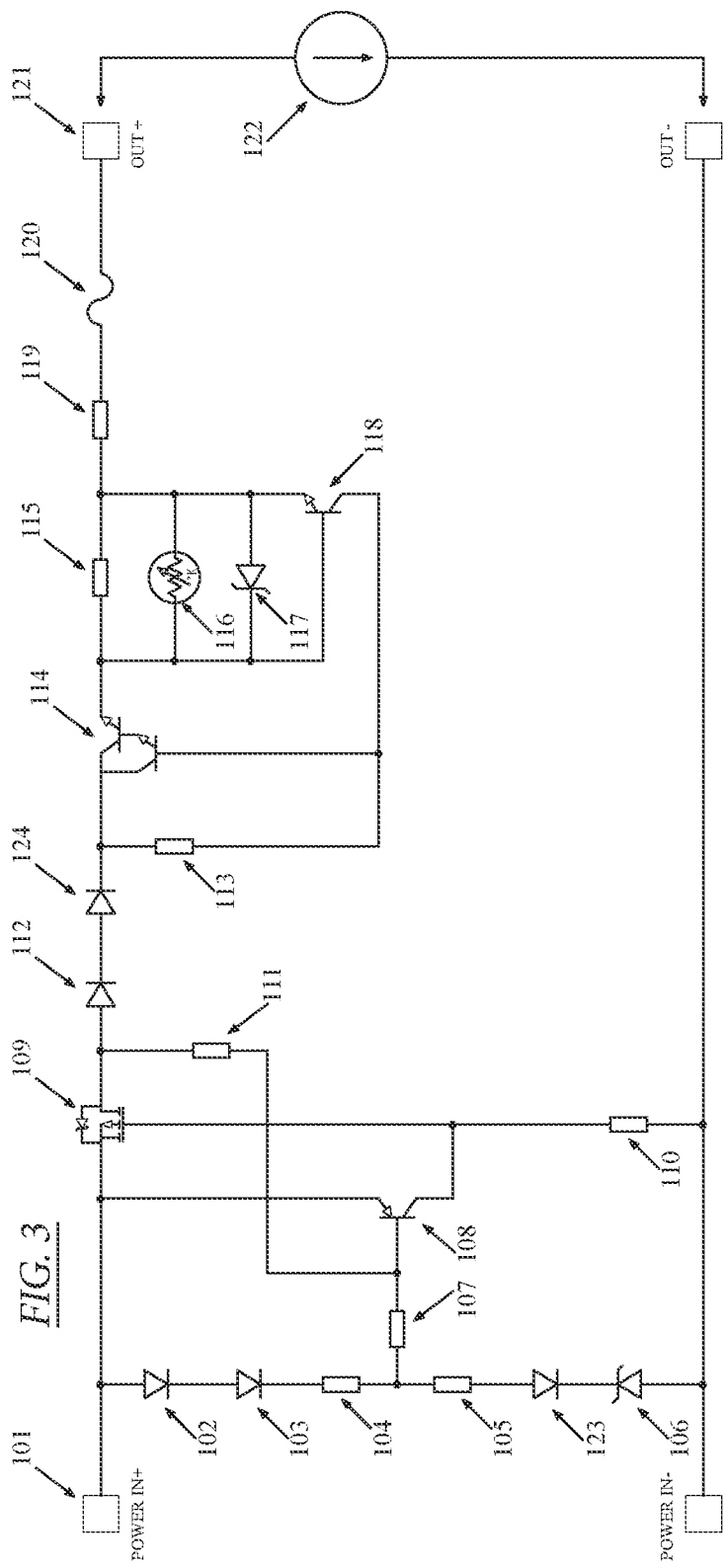
FIG. 3 is a schematic circuit diagram illustrating an alternative embodiment of the intrinsically safe circuit with low leakage current and current limiting features.

FIG. 3 illustrates an alternative embodiment of the intrinsically safe circuit 100. In the embodiment of FIG. 3, voltage control diodes 123 and 124 are added. The first voltage control diode 123 is disposed within the voltage clamping stage 130, in series, between the resistor 105 and the Zener diode 106. The second voltage control diode 124 is disposed within the current limiting stage 132 downstream of the diode 112 of the voltage clamping stage 130. The diodes 112 and 124 may be disposed in either or both of the stages 130, 132.

FIG. 4 illustrates another alternative embodiment of the intrinsically safe circuit 100 that includes the voltage control diodes 123 and 124 while omitting the diodes 102, 103 and the resistor 105. In the example of FIG. 4, the voltage control diode 123 is disposed between the resistor 104 and the Zener diode 106, as a result of the omission of the resistor 105. In FIGS. 3 and 4, the addition of the diodes 123, 124 increases the $V_{th}$ while maintaining the safe output voltage $U_o$ as approximately equal to the Zener voltage $V_z$. Still further, the exemplary embodiments of FIGS. 3 and 4 produce still lower leakage current (e.g., $U_i=U_o$). A voltage drop across the diode 124 compensates for any increase in the over-voltage threshold $V_{th}$ resulting from the addition of the diode 123. Therefore, the presence of the diode 124 effectively balances the voltage drop (between the positive input terminal 101 and the positive output terminal 121) and leakage current experienced by the intrinsically safe circuit 100.

The embodiment(s) detailed hereinabove may be combined in full or in part, with any alternative embodiment(s) described.

INDUSTRIAL APPLICABILITY

The above disclosure may represent an improvement in the art by providing an intrinsically safe circuit, with low leakage current, capable of operating reliably under more variable electrical conditions than conventional barriers. The present disclosure contemplates an intrinsically safe circuit that provides superior performance with lower leakage current than conventional barrier devices, including when the disclosed intrinsically safe circuit 100 is powered with a higher supply voltage than is acceptable for conventional barrier devices. Conventional devices would likely sustain damage if powered by input voltages of 26.6 V or greater, while the intrinsically safe circuit 100 of the present disclosure is configured to remain undamaged even if up to 90 V of input voltage are applied thereto. However, in part to deal with overvoltage scenarios, the intrinsically safe circuit 100 is further configured to disable the output 121 thereof when the input voltage exceeds 28.3 V or another appropriate over-voltage threshold $V_{th}$. The intrinsically safe circuit 100 is configurable to implement protections at over-voltage threshold $V_{th}$ of 22 V, 24 V, 27 V, 28 V, 30 V or another suitable or desirable voltage level.

The voltage drop of the intrinsically safe circuit 100 described hereinabove is lower than the conventional barrier(s) 1, such that, in contrast with conventional barriers, the intrinsically safe circuit 100, may operate with field transmitters requiring a 12 V power supply. Conventional devices capable of delivering low output current often result in a larger voltage drop due to the typical series resistance needed to limit the current of such devices. These features of conventional barriers eliminate any choice of barriers for field transmitters requiring a minimum supply voltage of 12 V and an output current of less than or equal to 50 mA. The intrinsically safe circuit 100 of the present disclosure represents an improvement in the art by providing a circuit suitable for use in an intrinsically safe barrier applications and capable of supporting field transmitters requiring a minimum supply voltage of 12 V and an output current of less than or equal to 50 mA. Moreover, the present disclosure contemplates adjustment of the intrinsically safe circuit 100 for compatibility with other intrinsic safety parameters. Modifying the Zener diode 106, such as by adjusting the Zener voltage via replacement thereof, results in one or more different safe output voltages $U_o$. Similarly, modifying/exchanging the sensing resistor 115 results in one or more different safe output currents J.

While some implementations have been illustrated and described, numerous modifications come to mind without significantly departing from the spirit of the disclosure, and the scope of protection is only limited by the scope of the accompanying claims.

To the extent that the terms include, have, or the like is used, such terms are intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The disclosed systems and methods are well adapted to attain the ends and advantages mentioned as well as those that are inherent therein. The particular implementations disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative implementations disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein.

It should be understood that the described instructions, operations, and systems can generally be integrated together in a single software/hardware product or packaged into multiple software/hardware products.

The use of the terms "a" and "an" and "the" and "said" and similar references in the context of describing the subject matter of the present disclosure (especially in the context of the following claims) are to be construed to cover both the singular and the plural, unless otherwise indicated herein or clearly contradicted by context. An element proceeded by "a," "an," "the," or "said" does not, without further constraints, preclude the existence of additional same elements. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

What is claimed is:

1. An intrinsically safe circuit comprising:
a Zener diode, a first transistor, a switching element, one or more resistors, and a current limiting stage, wherein an over-voltage threshold is determined by a voltage across the Zener diode, a base-emitter voltage of the transistor, and a voltage across the one or more resistors.

2. The intrinsically safe circuit of claim 1, wherein the over-voltage threshold is a sum of the voltage across the Zener diode, the base-emitter voltage of the first transistor, and the voltage across the one or more resistors.

3. The intrinsically safe circuit of claim 2, wherein a leakage current across the one or more resistors is negligible when an input voltage is below the over-voltage threshold.

4. The intrinsically safe circuit of claim 1, wherein the intrinsically safe circuit comprises a voltage clamping stage that includes the Zener diode, the first transistor, the switching element, and the one or more resistors.

5. The intrinsically safe circuit of claim 4, wherein the switching element is a MOSFET, and wherein the voltage clamping stage further comprises a pull-down resistor coupled between a gate of the MOSFET and the ground line.

6. The intrinsically safe circuit of claim 5, wherein a collector of the first transistor is coupled between the gate of the MOSFET and the pull-down resistor.

7. The intrinsically safe circuit of claim 6, wherein the voltage clamping stage further includes at least one additional diode.

8. The intrinsically safe circuit of claim 7, wherein the at least one additional diode, the one or more resistors, and the Zener diode are disposed in series between a positive voltage line and a ground line.

9. The intrinsically safe circuit of claim 8, further comprising an additional resistor coupled between a base of the first transistor and an intermediate node in the series of the at least one additional diode, the one or more resistors, and the Zener diode.

10. The intrinsically safe circuit of claim 1, wherein the current limiting stage comprises second, third, and fourth transistors, a fast-acting transient suppressor, and a negative temperature coefficient thermistor.

11. The intrinsically safe circuit of claim 10, wherein the fast-acting transient suppressor and the negative temperature coefficient thermistor are disposed in parallel.

12. The intrinsically safe circuit of claim 11, wherein the fast-acting transient suppressor and the negative temperature coefficient thermistor operate to protect the fourth transistor from over-voltage.

13. A system comprising:
a voltage source,
a load, and
an intrinsically safe circuit comprising a voltage clamping circuit and a current limiting circuit, wherein the intrinsically safe circuit is configured to accept an input voltage from the voltage source and to maintain a leakage current of less than 10 µA while the input voltage is less than a maximum safe voltage.

14. The intrinsically safe circuit of claim 13, wherein the load is an intrinsically safe component within an intrinsically safe environment.

15. The intrinsically safe circuit of claim 14, wherein the intrinsically safe component is a loop-powered field transmitter.

16. The intrinsically safe circuit of claim 14, wherein the intrinsically safe component is a level magnetostrictive transmitter.

17. The power circuit of claim 14, wherein the intrinsically safe circuit is configured to protect the intrinsically safe component from over-voltage events when the input voltage is up to 90 volts.

18. A method of operating an intrinsically safe field transmitter, the method comprising:
  coupling a voltage supply to an intrinsically safe circuit;
  coupling an intrinsically safe field transmitter to the intrinsically safe circuit; and
  powering the intrinsically safe field transmitter by the voltage supply via the intrinsically safe circuit, wherein the intrinsically safe circuit has a voltage drop less than 2 volts between an input voltage received from the voltage supply and an output voltage delivered to the intrinsically safe field transmitter.

19. The method of claim 18, wherein a leakage current of the intrinsically safe circuit is less than 10 µA.

20. The method of claim 18, wherein the intrinsically safe circuit protects the intrinsically safe field transmitter from over-voltage events when the input voltage is less than 90 volts.

* * * * *